July 31, 1962 J. M. CLUWEN 3,047,740
CIRCUIT ARRANGEMENT FOR LIMITING ELECTRICAL SIGNAL OSCILLATIONS
Filed Dec. 5, 1958
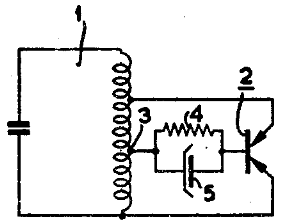
INVENTOR
JOHANNES MEIJER CLUWEN
BY Frank R. Jifari
AGENT

United States Patent Office 3,047,740
Patented July 31, 1962

3,047,740

CIRCUIT ARRANGEMENT FOR LIMITING ELECTRICAL SIGNAL OSCILLATIONS

Johannes Meijer Cluwen, Eindhoven, Netherlands, assignor to North American Philips Company, Inc., New York, N.Y., a corporation of Delaware Filed Dec. 5, 1958, Ser. No. 778,360
Claims priority, application Germany Jan. 7, 1958
4 Claims. (Cl. 307—88.5)

The present invention relates to circuit arrangements for limiting electrical signal oscillations, for example for use in frequency modulation (ultra-short wave) receivers. It is based on the principle of the dynamic limiter, in which the series-combination of a rectifier and a resistor-capacitor parallel-combination transmitting the modulation frequency is connected in parallel with a parallel resonant circuit. When this circuit arrangement is intended for use with heavy currents and low voltages, the capacitor should have a high value of capacitance.

The present invention has for an object to reduce the value of the capacitor necessary and has the feature that oscillations are supplied to a parallel resonant circuit which is connected in parallel with the emitter-collector path of a transistor, preferably a symmetrical transistor, and comprises a centre tap which is connected to the base of the transistor through a resistor-capacitor parallel-combination passing the modulation frequencies.

In order that the invention may be readily carried into effect, an example will now be described in detail with reference to the accompanying drawing.

The oscillations to be limited are supplied to a parallel resonant circuit 1. In parallel with this circuit 1 there is connected the emitter-collector path of a transistor 2, in particular a symmetrical transistor. The term "symmetrical transistor" is to be understood to mean a transistor whose characteristics remain unchanged after the emitter-collector-electrodes are interchanged. The circuit 1 comprises a centre tap 3 which is connected to the base of the transistor 2 through the parallel-combination of resistor 4 and a capacitor 5. The time constant of the resistor-capacitor parallel-combination is such that the modulation frequencies are transmitted by this parallel-combination.

The circuit arrangement operates as follows:

A voltage corresponding approximately to the average signal amplitude is produced across the filter 4, 5. When the amplitude of the voltage produced across the circuit 1 tends to increase rapidly, the voltage across the filter 4, 5 is unable to follow this rapid voltage increase. Hence, during the positive peak of the signal voltage the upper electrode of the transistor 2 and, during the negative peak of the signal voltage, the lower electrode of the transistor 2 are driven positive with regard to the base. The lower and upper electrodes respectively are then strongly biassed negatively due to the voltage produced across the filter 4, 5 so that a heavy current passes through the transistor 2 and tends to damp the voltage fluctuations. The quality of the resonant circuit 1, if not connected to the transistor 2, should be as high as possible in order for the limiting effect to be maximum. The damping current exceeds the low-frequency current supplied to the capacitor 5 by the base-collector-current amplification factor. This permits the capacitor 5 to be given a value much lower than is permissible with the usual dynamical limiter.

If required, the transistor 2 may be connected in parallel with a part of the circuit 1, as shown in the drawing, in which case naturally the centre tap should be provided midway between the connections to the emitter and the collector of the transistor 2.

What is claimed is:

1. A circuit arrangement for suppressing amplitude variations of electrical signal oscillations comprising a parallel resonant circuit, a transistor having base, emitter and collector electrodes, means connecting the emitter-collector path of said transistor in parallel with said parallel resonant circuit, and means comprising a resistor and capacitor connected in parallel from said resonant circuit to the base of said transistor.

2. A circuit arrangement for suppressing amplitude variations of electrical signal oscillations comprising a parallel resonant circuit consisting of a capacitor and a coil in parallel arrangement, a transistor having base, emitter and collector electrodes, means connecting the emitter-collector path of said transistor in parallel with said parallel resonant circuit, and means comprising a resistor and capacitor connected in parallel from the base of said transistor to a tap on said coil equally spaced between connections thereto with said emitter and collector electrodes.

3. A circuit arrangement as set forth in claim 1, wherein said transistor is of the symmetrical type.

4. A circuit arrangement as set forth in claim 2, wherein said transistor is of the symmetrical type.

References Cited in the file of this patent

UNITED STATES PATENTS

| | | |
|---|---|---|
| 2,885,575 | Cluven | May 5, 1959 |
| 2,892,080 | Chauvin | June 23, 1959 |

FOREIGN PATENTS

| | | |
|---|---|---|
| 787,333 | Great Britain | Dec. 4, 1957 |

OTHER REFERENCES

Book: "Receiver Circuitry and Operation," by Ghiradi and Johnson, Rinehart & Co., New York, 1951, page 180.